United States Patent
Moher et al.

(10) Patent No.: US 6,693,983 B1
(45) Date of Patent: Feb. 17, 2004

(54) METHOD AND SYSTEM FOR DETECTION OF SHORT DIGITAL RADIO MESSAGES

(75) Inventors: Michael L. Moher, Ottawa (CA); Stewart N. Crozier, Groton, MA (US); Paul Guinand, Fitzroy Harbour (CA)

(73) Assignee: Her Majesty the Queen in right of Canada, as represented by the Minister of Industry through the Communication Research Centre, Ottawa (CA)

( * ) Notice: Subject to any disclaimer, the term of this patent is extended or adjusted under 35 U.S.C. 154(b) by 0 days.

(21) Appl. No.: 09/412,229

(22) Filed: Oct. 5, 1999

(51) Int. Cl.[7] .............................................. H04L 27/06
(52) U.S. Cl. ....................... 375/341; 375/340; 375/344; 375/365
(58) Field of Search ................................. 375/226, 329, 375/341, 344, 365, 340; 370/206, 324; 714/780

(56) References Cited

U.S. PATENT DOCUMENTS

| 5,446,747 A |   | 8/1995 | Berrou ........................ 714/788 |
| 5,802,117 A | * | 9/1998 | Ghosh ........................ 375/344 |
| 5,974,087 A | * | 10/1999 | Nowara ....................... 375/226 |
| 6,134,286 A | * | 10/2000 | Chennakeshu et al. ..... 375/365 |
| 6,421,399 B1 | * | 7/2002 | Avidor et al. ............... 375/329 |

OTHER PUBLICATIONS

Shulin & D. J. Costello, Jr./Maximum Likelihood Decoding of Convolutional Codes/ Prentice Hall, 1983/pp. 315–322.
D.C. Rife & R.R. Boorstyn/ Single–Tone Parameter Estimation from Discrete–Time Observations/IEEE Transactions on Information Theory, vol. IT–20, No. 5, Sep. 1974 /pp. 591–598.
Detection of Signals with Random Parameters/ 1971/ pp. 197–227.
S. N. Crozier/ Theoretical and Simulated Performance for a Novel Frequency Estimation Technique/pp. 423–428.
Robert A. Scholtz/ Frame Synchronization Techniques/ IEEE Transactions on Communications, vol. Com–28, No. 8, Aug. 1980/ pp. 1204–1213.

* cited by examiner

Primary Examiner—Shuwang Liu
(74) Attorney, Agent, or Firm—Polster, Lieder, Woodruff & Lucchesi, L.C.

(57) ABSTRACT

Digital signals transmitted on an RF carrier modulated in phase and amplitude and subject to noise constitute separate bursts each comprising information symbols of data and a pair of separated unique words. The signals are subjected to processing which involves reception of the signals and an initial conversion to approximate baseband and then analog to digital sampling. Quadrature and in phase samples are then stored in a buffer. The buffered samples are subjected to coarse timing, coarse frequency synchronization, a first phase correction, fine timing, further phase and amplitude correction and finally to fine frequency correction and subsequent reliability estimation.

23 Claims, 5 Drawing Sheets

METHOD AND SYSTEM FOR DETECTION OF SHORT DIGITAL RADIO MESSAGES

FIELD OF THE INVENTION

This invention relates to the detection of short digital messages transmitted by radio, either terrestrial or relayed by satellite. More particularly the invention is directed to a novel method for effective synchronization and detection of short digital radio messages reliably under very noisy channel conditions.

BACKGROUND OF THE INVENTION

Traditional digital radio transmission techniques use a single channel per carrier where one channel is dedicated to each user, the user transmissions are typically long in duration. Synchronization techniques for such systems often rely on long term averaging in order to work reliably. With greater demand for spectral resources, time division multiple access (TDMA), where multiple users share the same channel in a time ordered fashion, is becoming common. A current example is TDMA cellular telephony standard, see Ref 7, IS-54, TIA Interim Standard. With TDMA systems, the individual messages or bursts transmitted are often very short, so that very efficient and non-traditional synchronization techniques must be employed.

For short message transmission each burst typically includes a unique word, that is, a sequence of known bits or symbols, distributed in some manner throughout unknown data symbols making up the rest of the burst. The purpose of the unique word is to assist synchronization to the burst, in frequency, time, and phase. Synchronization in many current systems is also assisted through precompensation of the burst, so that uncertainty in time and frequency is limited to a small range. This precompensation information is obtained from feedback from the synchronization of previously transmitted bursts. This reduces the search range of the receiver synchronization circuitry, but does not preclude the necessity to perform fine synchronization for proper extraction of the data from the noise. It is with fine synchronization that the present invention is concerned.

Although forward error correction is employed to reduce the error rate, as lower power transmitters are deployed and radio channel environments become noisier, the raw channel bits become even less reliable before the forward error correction decoding is undertaken, and synchronization of the unique word becomes more crucial for synchronization. Furthermore for short bursts, the unique word length must be minimized to reduce the overhead (portion of the signal not carrying the data). A further constraint in mobile radios is that limited processing power and time is available. Thus, although greater demands are being placed on the synchronization techniques they still must be simple and practical enough to be implemented in a mobile terminal.

SUMMARY OF THE INVENTION

It is an object of this disclosure to provide a method, which is of relatively low complexity, for reliably synchronizing and detecting very short digital radio messages under very noisy channel conditions.

is a further object to provide a method for integrating synchronization, detection, and forward error correction decoding in such messages.

Here described is a multi-stage method for reliably detecting short digital messages. It assumes the message contains unique words, known at the receiver, and unknown data. The unique words are assumed to be multiple phase shift keying (MPSK) modulated, the preferred embodiment is binary phase shift keying (BPSK). The data portion of the burst may be MPSK modulated or multiple quadrature amplitude modulation (MQAM). The method described comprises a series of steps that produce successive refinements of the synchronization and detection process.

The method is implemented using a digital software receiver. That is, in the receiver, the received, modulated, RF signal is down-converted to an approximate complex baseband signal and then both in-phase and quadrature components are sampled by an analog to digital converter (A/D). The frequency uncertainty (the error in the down-conversion process) can be typically up to 10% of the symbol rate, beyond this the synchronization reliability decreases. The timing uncertainty can be any number of symbol periods but the synchronization reliability improves as the timing uncertainty decreases.

In the described method for more reliably detecting and decoding short digital messages received over a noisy channel, nine steps are preferred. The first step is to obtain initial frame synchronization for the received burst. The second to obtain an initial estimate of the carrier frequency error. The third is to correct this frequency error in the received samples. The fourth step is to obtain a refined timing estimate. The fifth step is to perform detection filtering, simultaneously correcting for the residual timing error and decimating to one sample per symbol. The sixth step is to estimate the phase and amplitude of the received burst and correct it. The seventh step is to obtain a refined frequency estimate and correct for it. The eighth step is to compute reliability estimates or, optionally, to make hard decisions for the individual bits defining each transmitted symbol. A ninth and optional step is to use the reliability estimates in a soft-input decoding algorithm.

In the process here described some of the steps are known in the prior art.

The first step of coarse timing (frame synchronization) is prior art, for example see, Ref. 1), R. A. Scholtz, "Frame Synchronization Techniques," IEEE Trans. Commun., vol. COM-28, No. 8, Aug. 1980, pp. 1204–1213, which is included herein by reference. This step briefly comprises; differentially detecting the received signal over that time interval which potentially corresponds to the unique word (including the estimated uncertainty in this); correlating the result with the known differential unique word; and choosing the point of maximum correlation in the uncertainty window as the frame synchronization point.

The second step of coarse carrier frequency synchronization is also known in the prior art, for example, see Ref. 2), S. Crozier, "Theoretical and simulated performance for a novel frequency estimation technique," Third Int. Mobile Satellite Conf., Jun. 16–18$^{th}$, 1993, Pasadena, Calif., pp.423–428, which is included herein by reference. The steps of this algorithm are, briefly: using the soft symbol estimates implied by the timing estimate of the first step, remove the modulation from the signal (such as by multiplying by the conjugate, if using multiple phase shift keying MPSK). With the derived pure carrier modulation-removed signal, compute the average phase-differential between successive symbols of the unique word. In the third step, improve this phase differential estimate by correcting the derived carrier frequency by the initial phase-differential estimate. The frequency estimate and correction provided by the second and third steps can be further improved by estimating the phase-differential over more than one symbol period. Crozier discusses details on determining the best delay spacing.

The fourth step of fine timing estimation also draws partly upon the prior art, for example, see Ref. 3), A. D. Whalen, Detection of Signals in Noise, San Diego: Academic Press, 1971 and also see Ref. 4), H. L. van Trees, Detection, Estimation and Modulation Theory, New York: John Wiley & Sons, 1968, both of which are included herein by reference. These authors indicate that the maximum likelihood approach to obtaining the timing of a known signal is to correlate the noisy signal received with the known signal over the window of timing uncertainty. The time of peak correlation between the two corresponds to the optimum timing.

In this present disclosure, the known signal is the filtered unique word that is part of the transmitted burst, and correlation is performed in the discrete sample domain. The steps of this algorithm comprise:

i) perform a correlation at the timing given by the initial estimate of frame sync obtained from the first step above, and at one sample on either side of this;

ii) perform an interpolation between the magnitudes of the resulting correlations; and iii) determine the time shift in terms of the offset (delay or advance) with respect to the coarse timing at which the interpolation peak occurs over the range of these three samples.

The preferred approach is to use a parabolic interpolation function. The timing error can then be corrected using a digital filter with a compensating timing offset. The preferred approach for the filter is to precompute a number of filters with relative fraction sample delays, e.g, 0, ¼,½,¾ (when using four fraction sample offsets), and select the one that most closely compensates the timing error.

Background to the sixth step of phase and amplitude estimation is described, for example, in Ref. 5), D. C. Rife and R. R. Boorsty, "Single-tone parameter estimation from discrete-time observations," IEEE Trans. Inform. Theory, Vol. IT-20, No. 5, September 1974., which is included herein by reference. In this algorithm, once one has an estimate of the timing of the unique word, one removes the unique word modulation. The result is a single-tone to which the prior art can be applied directly. As is well known in the art, if the unique word is MPSK modulated, the modulation can be removed by multiplying by the complex conjugate of known symbols.

BRIEF DESCRIPTION OF THE DRAWINGS

Embodiments of the invention will now be described with reference to the accompanying drawings, in which.

DETAILED DESCRIPTION OF THE PREFERRED EMBODIMENTS

Figure 1:
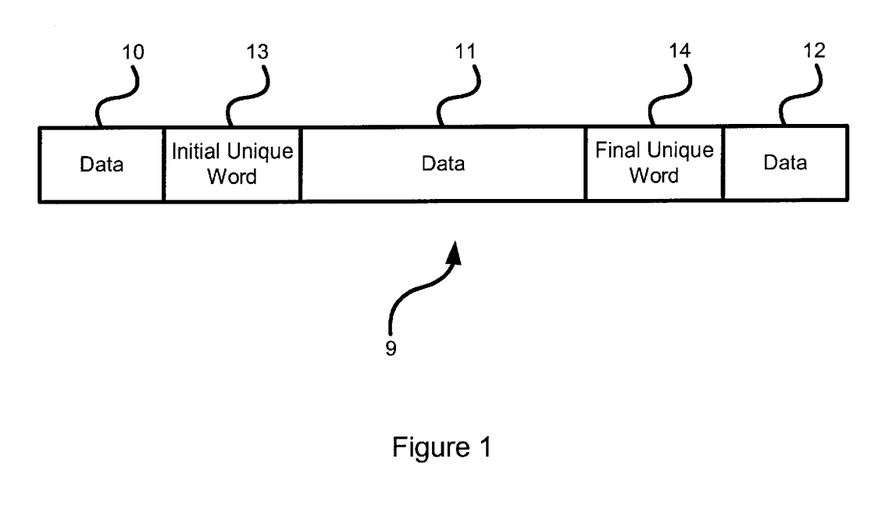
FIG. 1 is a schematic block diagram of a typical burst structure to which embodiments of the present invention can be applied.

In the novel method of processing received signal samples of a short digital radio transmission, an example of a typical transmitted burst structure 9 to which this method can be applied is shown in FIG. 1. There is a data portion 10, 11, 12 plus two unique words 13, 14, one at either end or close to the end. The unique word symbols may also be interleaved with the data symbols if desired. The symbols making up the unique words are known at the receiver but need not be the same, nor of the same length. For transmission, such a burst would have undergone modulation, filtering, frequency translation, and amplification. This description here assumes a linear modulation scheme but the method applies when distortion is present due to other transmission elements. This distortion may be unintentional or intentional, such as predistorting the symbol constellation before passing through nonlinear amplification.

The transmitted burst is received in a digital software receiver and the received burst is subjected to analog to digital conversion A/D. In a preferred embodiment, the RF signal is down-converted to an approximate complex baseband signal and then both in-phase and quadrature components sampled by the analog to digital converter. There are alternative approaches to obtaining the same result as those skilled in the art will appreciate, for example, using a single A/D to sample at a low IF and then down-converting to baseband in software. A preferred embodiment is to sample the received signal at four times the symbol rate of the modulation. The number of bits of A/D resolution required in any particular case depends upon i) the dynamic range of the signal, and ii) the degradation due to quantization noise that can be tolerated.

Figure 2:
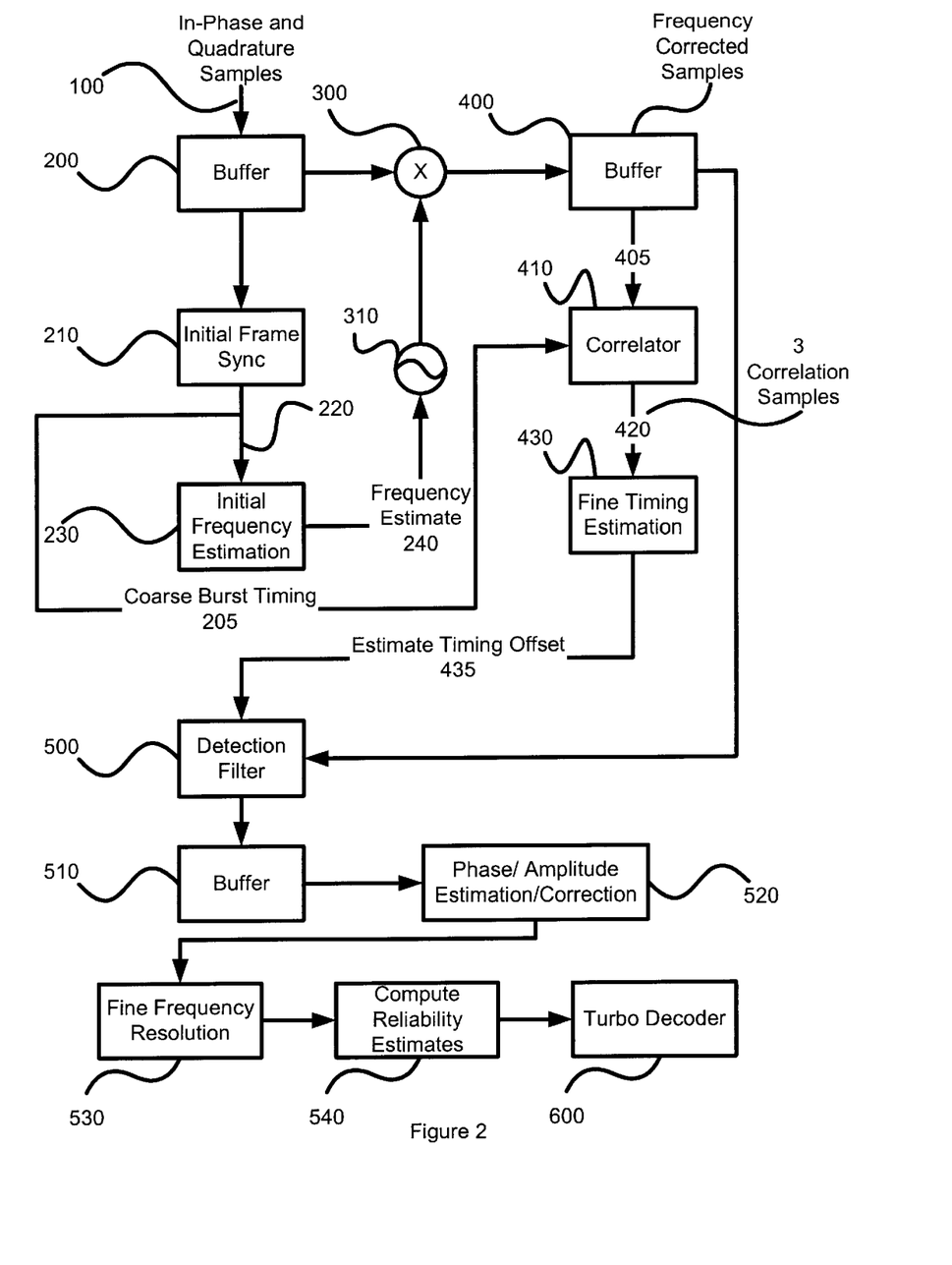
FIG. 2 is a schematic block diagram of the steps embodied in the present invention.

FIG. 2 shows a schematic block diagram of a preferred embodiment of the present invention, indicating the different processing steps to be performed. The input at 100 is the in-phase and quadrature baseband digitized samples of the received signal over the time interval of the duration of the burst plus any timing uncertainty. These samples are stored in buffer 200 to allow multiple processing passes.

The first step is to establish frame synchronization 210. The frame synchronization algorithm is applied only to that portion of the samples in the buffer 200 corresponding to the position in the burst of the unique word symbols plus any timing uncertainty in the position. Frame synchronization is estimated using prior art, see Sholtz Ref. 1) as described above.

The frame synchronization is estimated by processing the sampled signal as follows:

Let $x(nT)$ be samples of the complex received sequence after detection filtering, nominally, $n=0, \ldots$, and T represents the spacing between samples. Normally one samples at multiple times the symbol rate; often, a good sampling rate is four times the symbol rate, i.e., $T=T_s/4$ where $T_s$ is the symbol period. Let $c(mT)$, $m=1, \ldots, N$ be noiseless samples of the known unique word. For the case shown in FIG. 1 where there is an initial 13 and final 14 unique word, this can be represented as $\{c(mT)\}=\{c(T),c(2T), \ldots c(N_i), 0,0,0 \ldots 0, c(N-N_f),c(N-N_f+1), \ldots ,c(N)\}$, where $N_i$ is the number of samples in the initial Unique Word, $N_f$ is the number of samples in the final Unique Word, and the zeros are place holders for the unknown data between the unique words. In practice, one takes advantage of these zeros by not including them in the calculation.

The signal is first differentially detected by performing the calculation $$y(nT)=x(n)^*x((n-4)T)^c$$

when four times over sampling has been performed, and $(.)^c$ represents complex conjugation. A differential unique word is computed in the same manner to produce $\{c_d(mT)\}$. The differential received sequence is then correlated with the differential unique word to form a frame sync sequence $$f(nT) = \left| \sum_{j=2}^{N} y((n+j)T)^* c_d(jT)^c \right|$$

Frame sync is then obtained by comparing f(nT) to a threshold for different values of n and declaring frame sync whenever the threshold is exceeded. Alternatively, if the unique word is known to occur within a given time interval, choose the largest f(nT) in the given interval as the start of the unique word. This type of approach to frame sync has been described in Sholtz.

The output of the frame synchronization process is a reference sample number indicating the relative timing position 205 of the burst within the buffer 200 and also a set of buffered soft decisions 220 corresponding to the unique word symbols.

The second step of the method is to process the soft unique word symbols 220 according to the prior art, as represented by block 230, (see Crozier Ref. 2), as described above, to produce a coarse frequency estimate 240.

This initial coarse frequency estimate is obtained by processing the received samples as follows. Having obtained frame sync, one knows where the unique word symbols are in the received sequence. Without loss of generality, assume that the symbol estimates at the output of the differential detector, described above, $y(n^*T)$, $y((n^*+5)T)$, $y((n^*+9)T)$, . . . , correspond to noisy estimates of the differential unique word symbols $c_d(T)$, $c_d(5T)$, $c_d(9T)$, . . . where $n^*$ is the sample index corresponding to the estimated start of frame obtained from the first step. Then the following calculation $$A e^{j\Delta\omega T} \approx \sum_{j=0}^{N-2} y((n^* + 4j)T)^* c_d((1+4j)T)$$

provides an estimate of the complex phasor defining the frequency difference between adjacent symbols. The frequency error $\Delta\omega$ can be determined from the argument of the resulting phasor. This is a coarse estimate of the frequency error in the received signal. This approach has been described by Crozier.

The coarse frequency estimate 240 is used in the third step of the method to update the frequency of a digital oscillator 310. The output of oscillator 310 is input to a multiplier 300. The entire buffer of received samples is then fed out of 200 to multiplier 300, the resultant frequency corrected samples (baseband frequency corrected) are stored in a buffer 400.

The fourth step of the method is to obtain a fine timing estimate. This uses only the portion 405 of the coarse frequency corrected burst samples in the buffer 400 corresponding to the unique word samples. These samples are correlated with a locally stored filtered unique word matched to the transmitted unique word of interest in 405. As is well known in the art, the correlator 410 can be embodied as a mixer (or multiplier), a waveform generator (or a stored waveform), and an integrator. The digital correlation 410 is performed at three different time offsets, the one indicated by the initial timing reference sample 205 and one sample on either side. This produces three correlation values 420. A parabolic interpolation 430 is performed between the squared magnitudes of the three resulting correlation values. The location of the maximum of the interpolation function, over the range of the three samples, is determined. This location value is converted to a relative offset 435, as a fraction of a sample period. This best value offset is used to select or compute a detection filter 500 into which the frequency corrected burst samples from buffer 400 are fed.

The calculations performed in this step are described in the following. Let $x_c(nT)$ represent the received samples after having been frequency corrected as described previously. If $n^*$ corresponds to the sample estimated to be the start of the frame, the following three correlations $$p(jT) = \left| \sum_{k=0}^{N} x_c((j+k)T) c(kT)^c \right|$$

for $j=n^*-1$, $n^*$, $n^*+1$, are then performed. The parabolic interpolation is performed through the three values: $p((n^*-1)T), p(n^*T), p((n^*+1)T)$. The location of parabola maximum in this range corresponds to the optimum timing estimate The fifth step of the method is the filtering in filter 500 of the coarse frequency corrected sample from buffer 400 to reduce noise and interference. The filter is selected to compensate for the fractional sample offset (delay or advance) estimate 435 and thus correct the residual timing error after frame sync. The filtered output is down-sampled to one sample for each symbol in the burst, including the unique word symbols, to be used in subsequent steps, and stored in a buffer 510.

The sixth step of the method is in 520 to estimate and correct for the phase and amplitude errors of all the symbols in the burst which have undergone coarse frequency and fine timing correction and as now stored in buffer 510. This is done by removing the modulation from each unique word to produce a single tone. The phase and amplitude of each unique word is then estimated using the prior art, see Rife and Boorstyn Ref. 5) as described above, for discrete samples of a single tone.

Phase and amplitude estimates can be obtained by performing a correlation similar to that used for fine timing. These calculations are performed on the signal samples after fine timing correction. Let $x_{cc}(nT)$ be the signal samples after coarse frequency and fine timing correction. Then the correlation with the known unique word is performed.

$$P = \sum_{j=1}^{N} x_{cc}(jT) c(jT)^c$$

Then, the argument of the complex correlation P is an estimate of the phase error relative to the reference unique word c(kT). The magnitude of the complex correlation P is an estimate of the received signal amplitude, assuming the reference unique word is normalized to unit amplitude. This method is described in Rife and Boorstyn. Thus, in 520 the amplitude and phase corrections for the unique word samples in 510 are estimated. As further explanation of this step; the correlation with the known word is equivalent to multiplying by the conjugate, i.e., removing the modulation to produce a tone, and then summing. This tone is very low frequency and is consequently of almost constant phase over the duration of the unique word. Summing the samples of this very low-frequency tone produces a complex number. The magnitude of this complex number is a measure of the average amplitude over the duration of the unique word; the phase of this number provides an estimate of the average phase.

The amplitudes of the other symbol samples are then normalized using either the average or an interpolation of the amplitude estimates from the unique words. The phase of these symbol samples can be corrected using a linear interpolation of the phase estimates from the unique words. This phase correction can alternatively be included in the seventh step of fine frequency estimation to be described. Corrected samples in the sixth step are buffered in 520.

Figure 3:
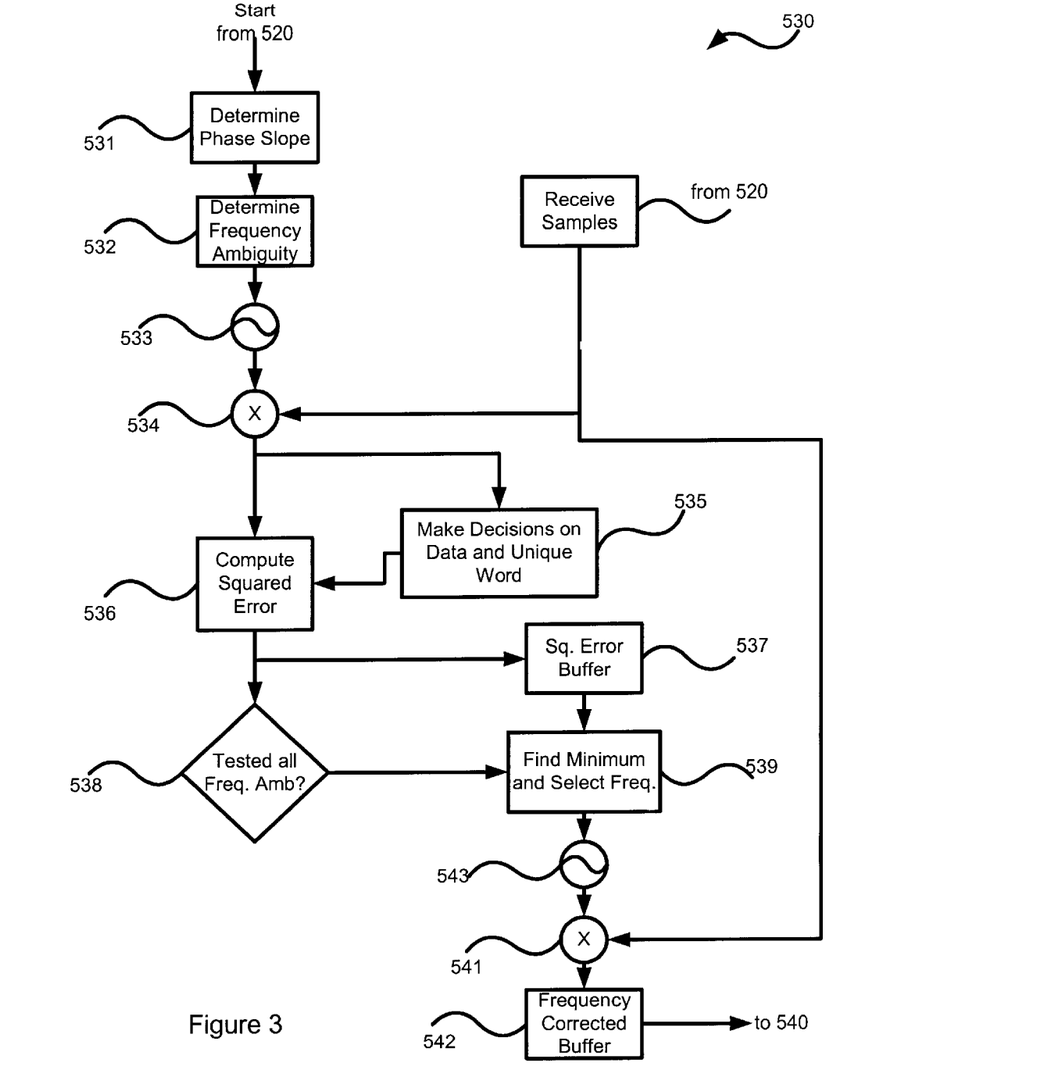
FIG. 3 is a schematic block diagram of the fine frequency resolution step.

The seventh step is fine frequency estimation at 530, and is based on resolving any remaining frequency ambiguities. The preferred embodiment of this is illustrated in detail in FIG. 3, and is comprised of the following sub-steps:

a) from the phase estimates for the unique words 13 and 14 at either end of the burst found in the previous step at 520, determine 531 the phase difference between the beginning and end unique words.

b) select 532 one of the possible frequencies in the acceptable range to produce this phase difference. These permissible frequencies are determined by the separation of the unique words and the phase difference found in a) $\pm 2k\pi$, where $k=0, \forall 1, \forall 2, \ldots$ (i.e., is the set of integers positive and negative including zero over a range that covers the residual frequency uncertainty).

c) for the frequency estimate selected in b), frequency correct the samples stored in buffer 520 with a digital oscillator 533 and multiplier 534. Make hard symbol decisions 535 on each unknown data symbol of the burst by choosing the closest symbol, and use the correct decision for each unique word symbol. As is well known in the art, when the burst amplitude is approximately normalized, making hard decisions on undistorted 16QAM symbols, for instance, can be embodied by comparisons of the in-phase and quadrature samples with the thresholds of 0 and ±2. In general, for any MQAM constellation (distorted or undistorted), compute the squared error 536 between the symbol decisions and the soft symbol samples, and store the result in a buffer 537. In general, one can use all of the unique word symbols and, optionally, either all, some, or none of the data symbols in the burst when computing this squared error. The squaring process not only removes sign in the error figures but also provides optimum weighting when summed. The contribution of the unique word portion and the data symbol portion to the sum of squared errors may be weighted differently to reflect the confidence in the decisions depending on whether it relates to the unique word or to data and on its relative position within the burst. Low signal to noise ratio will, for instance, reduce confidence level.

d) iterate 538 steps b) and c) for all frequency ambiguities in the acceptable range.

e) determine 539 the frequency ambiguity corresponding to the smallest sum of the squared errors for each interaction of b) and c). Frequency correct the soft symbol samples from buffer 520 for this residual frequency error using a digital oscillator 543 and multiplier 541. Alternatively, the versions of frequency corrected bursts obtained in step c) above, could be stored and the appropriate version selected.

f) store the fine frequency corrected symbol samples from 520 in buffer 542.

Figure 4:
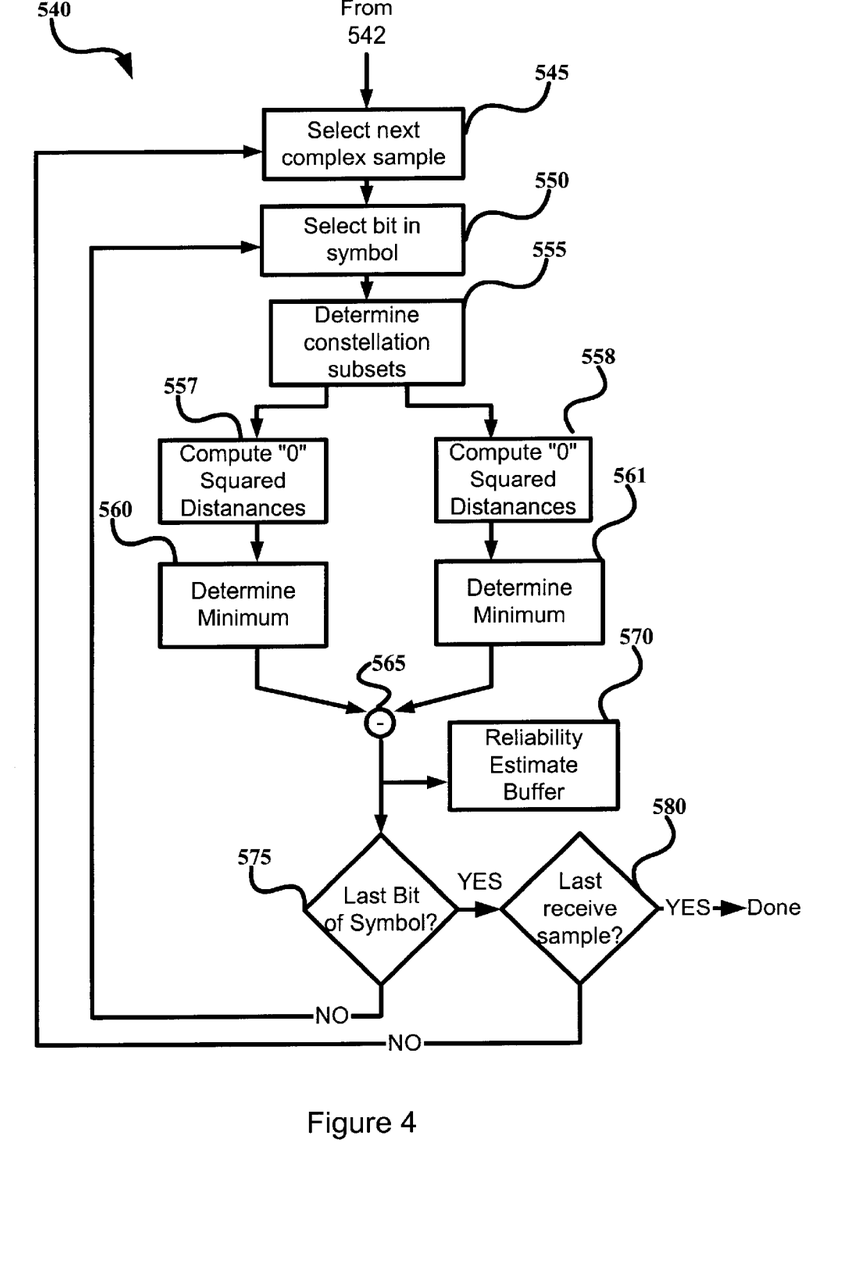
FIG. 4 is a schematic block diagram of the calculation of the reliability estimates for individual bits.
Figure 5:
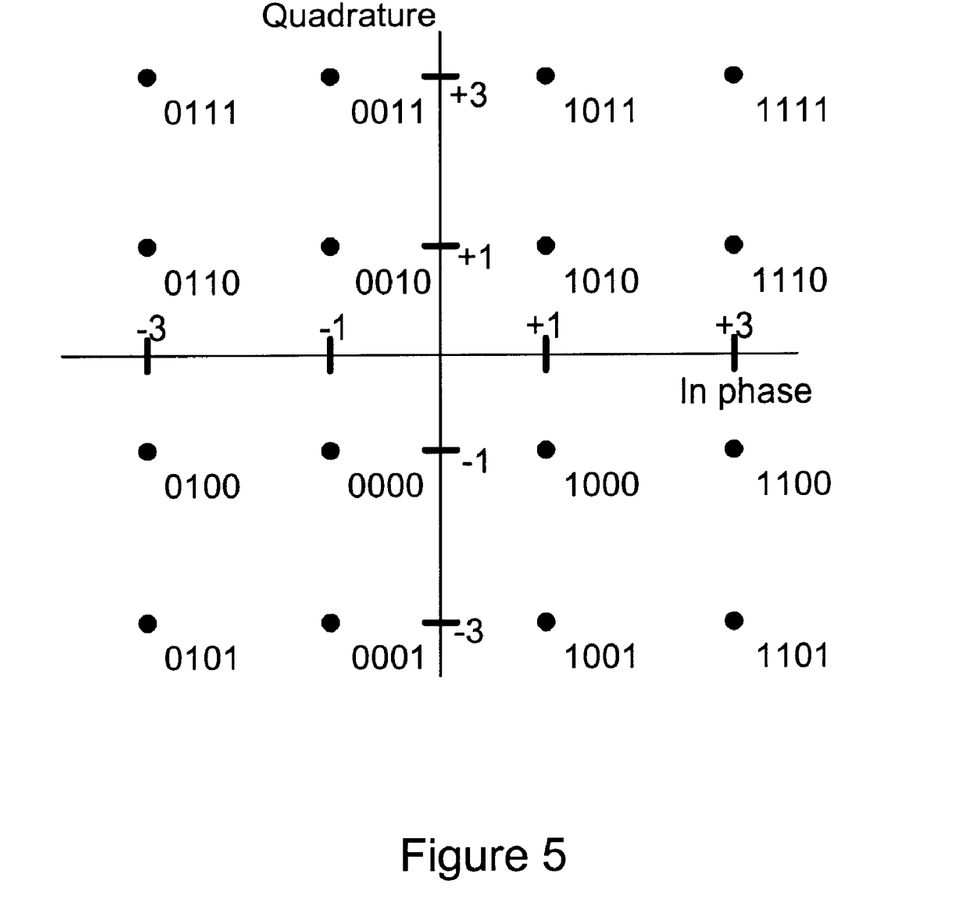
FIG. 5 is a schematic block diagram of a 16QAM constellation with preferred bit-mapping.

The eighth step of the present process, as shown in FIG. 2, is to compute approximate reliability estimates and provide improved soft decisions for the bits for the data symbols. In FIG. 4 the computation of the reliability estimate for a particular bit associated with a soft symbol s is illustrated in detail. This step is based on the fact that each MQAM symbol (and specifically 16QAM) has both a binary representation, e.g., 1101, and graphically a constellation point representation, e.g. (+3,−3). A preferred mapping between the binary representations and the constellation points for 16QAM is shown in FIG. 5. There the first two binary digits signify the in-phase coordinate and the second two signify the quadrature coordinate. The process for the eighth step is comprised of the following sub-steps;

a) determine 555 those eight 16QAM constellation points with a "0" in the first bit of the corresponding binary representation, i.e., having the binary representation "0xxx" where x is either 0 or 1.

b) for the soft symbol s, compute 557 for each of those eight constellation points in step a) the square of the distance from s.

c) determine 560 the first minimum of the squared distances.

d) determine 555 those eight 16QAM constellation points with a "1" in the first bit of the corresponding binary representation, i.e., having the binary representation "1xxx".

e) for the soft symbol s compute 558 for each of those eight constellation points in step d) the square of the distance from s.

f) determine 561 the second minimum of these last mentioned squared distances.

g) determine the difference 565 between the first minimum and the second minimum and store this in buffer 570 as the reliability estimate for the first bit in s. The squaring process in b) and e) not only removes sign but also provides optimum weighting in step g).

h) iterate 575, 550 steps a) to g) for the second, third, and fourth bit positions and store in buffer 570 as the reliability estimates for the second, third and fourth bits in s.

i) iterate 580, 540 steps a) to h) inclusive for each soft symbol sample.

The eighth step can be simplified with correlations and table lookups for the squared symbol powers to correct/convert to squared distances. Table lookups can also be used for each of the constellation points and their binary subsets. This eighth step assumes that the phase and amplitude of the symbol samples have been approximately normalized in the sixth step to the assumed constellation point scaling. The reliability estimates in the buffer 570 must be ordered to correspond to the transmitted bits. Those skilled in the art will appreciate that the eighth step can be generalized to both distorted and undistorted MQAM constellations including, for example, MPSK constellations. There are a number of ways of doing table lookup, for example, one way is for each symbol to compute the squared distances to each constellation value and store these values in a table. Then for each bit in the table instead of having to compute the squared distances they can be looked up in the table. Another way is to discretize the two dimensional space using a grid pattern, e.g. a 16×16 grid producing 256 grid points, i.e. with much finer resolution than the true constellation points. Then for each symbol value one would determine which grid point was closest. Then a predefined table would map grid points to approximate reliability values for all the bits in the symbol.

An optional final step 600 in FIG. 2, is to perform further processing of the soft bit decisions obtained at 570. An example of such further processing is a forward error correction decoding scheme. An example of such is the Viterbi algorithm where the soft bit decisions are used to determine a metric for all possible received sequences or partial sequences, discard those that are improbable, and determine the bit sequence that was most likely to have been transmitted. This is described in Ref 6), S. Lin and D. J. Costello, Jr., Error Control Coding—Fundamentals and Applications, Englewood Cliffs, N.J.: Prentice Hall, 1983. Another example is the Turbo decoding algorithm as described in Ref. 8) C. Berrou, "Error-correction coding method with at least two systematic convolutional codings in parallel, corresponding iterative decoding method, decoding module and decoder," U.S. Pat. No. 5,446,747, 1995. Both references described above are included herein by reference.

Having described preferred specific embodiments of the invention, the subject matter of the invention in which we claim protection by patent is set forth in the following claims.

References

1) R. A. Scholtz, "Frame Synchronization Techniques," IEEE Trans. Commun., vol. COM-28, No. 8, Aug. 1980, pp.1204–1213.
2) S. Crozier, "Theoretical and simulated performance for a novel frequency estimation technique," Third Int. Mobile Satellite Conf, Jun. 16–18 $^{th}$, 1993, Pasadena, Calif., pp.423–428.
3) A. D. Whalen, Detection of Signals in Noise, San Diego: Academic Press, 1971.
4) H. L. van Trees, Detection, Estimation and Modulation Theory, New York: John Wiley & Sons, 1968.
5) D. C. Rife and R. R. Boorstyn, "Single-Tone Parameter Estimation from Discrete-Time Observations," IEEE Trans. Inform. Theory, Vol. IT-20, No.5, September 1974.
6) S. Lin and D. J. Costello, Jr., Error Control Coding—Fundamentals and Applications, Englewood Cliffs, N.J.: Prentice Hall, 1983.
7) IS-54, TIA Interim Standard.
8) C. Berrou, "Error-correction coding method with at least two systematic convolutional codings in parallel, corresponding iterative decoding method, decoding module and decoder," U.S. Pat. No. 5,446,747, 1995.

What is claimed is:

1. In a method for processing a digital signal comprising a burst of symbols constituting data and a pair of known first and second separate unique words, wherein said burst has been transmitted on a carrier, modulated by said burst, and which carrier has been subsequently down converted to an approximate baseband signal, and wherein said approximate baseband signal has been subjected to analog-to-digital sampling, digitized amplitude and phase information samples constituting said baseband signal over a time period corresponding to the duration of said burst plus timing uncertainties being thence initially corrected by subjecting to initial timing synchronization in an anticipated time frame for said burst and to an initial frequency correction toward zero baseband, the improvement in obtaining a finer frequency correction for said initially corrected samples representing said baseband signal, which comprises:

i. removing modulation from said initially corrected samples corresponding to at least one symbol in each of said known first and second unique words to produce corresponding first and second unmodulated baseband tones, ii. estimating a phase shift)$\Delta\Phi$ between a first average phase of the first tone and a second average phase of the second tone, iii. determining a set of possible phase ambiguities)$\Delta\Phi + 2k\pi$ for such phase shift, where k is selected from the set of integers and corresponding frequency offsets to such phase ambiguities up to a limit imposed by predetermined known uncertainty in baseband frequency of said initially corrected samples, iv. selecting one of said frequency offsets, v. further correcting the initially corrected samples by one of said frequency offsets with a phase initialized to match said first and second average phases, vi. determining, for each symbol constituting each unique word the squared error of its corresponding soft symbol determined from the corrected samples of step v, vii. computing the sum of the squared errors, viii. iterating steps iv to vii for each frequency offset, ix. calculating the minimum of the sums obtained in step vii, x. selecting as a fine frequency estimate that frequency offset which yields the minimum in step ix, and xi. storing as fine frequency corrected samples, the initially corrected samples further corrected by said selected fine frequency estimate.

2. The method of claim 1 including between the steps vi and vii the following additional steps:

xii. for data symbols in said initially corrected samples, deciding a value for each said data symbol by choosing the closest symbol known to have been a possible transmitted symbol, xiii. determining for each decided value the squared error of its corresponding soft value.

3. The method of claim 1 wherein the initially corrected samples have been subject to a phase correction and an amplitude correction, the phase correction being an estimated linear interpolation from baseband phases found for symbols in the unique words, the amplitude correction corresponding to amplitude estimates for symbols in the unique words.

4. The method of claim 3 wherein the amplitudes of said initially corrected samples have been corrected by normalizing using averages or interpolation from the said amplitude estimates for symbols in the unique words.

5. The method of claim 2 wherein step vii is the step of computing a weighted sum of the squared errors of the unique word symbols and the data symbols, such data symbols being weighted in accordance with confidence in the decisions of step xii.

6. A method of computing an approximation of the reliability value of individual bits in an information symbol constituted by a multiplicity of such bits, and which symbol has been degraded by noise; where the true value of the information symbol is defined by one of a chosen plurality of constellation points in a two-dimensional planar array; which comprises the steps of:

i. plotting all those true values as such constellation points within the two-dimensional array, ii. defining each true value in the array by a corresponding unique set of bit values, iii. predetermining an initial soft value for the said symbol degraded by noise, iv. mapping that soft value onto the array as a soft value point, v. computing the square of the distance of said soft value point from each constellation point which has a "0" bit in a first position of its said set, vi. finding a first minimum of the squares computed in step v, vii. computing the square of the distance of said soft value point from each constellation point which has a "1" bit in said first position of its said set, viii. finding a second minimum of the last mentioned squares computed in step vii, ix. subtracting the first minimum from the second minimum, x. recording the result of step ix as a reliability estimate for that bit in said first position in the set of bit values for said symbol represented by the soft value, and xi. reiterating steps v to x for obtaining reliability estimates for the bits in the remaining positions in the set for said symbol represented by said soft value.

7. The method of claim 6 wherein the reliability estimates are input to a decoding step for the information symbol.

8. Th e method of claim 7 wherein said decoding step is for forward error correction and in effected in a decoder selected from Viterbi and Turbo decoders.

9. The method of claim 6 said constellation points belonging to an MQAM constellation.

10. The method of claim 9 wherein said constellation points belong to a 16QAM constellation.

11. The method of claim 6 wherein steps v, vi, vii and viii comprise using table lookups for determining said squared distances, and said minima.

12. The method of claim 6 wherein steps v through xi inclusive are executed using table lookups.

13. The method of claim 6 comprising the step of weighting the reliability estimates for the bits in said symbol represented by the soft value, dependent upon the information symbol concerned.

14. The method of processing a received signal which has been transmitted as a burst on a carrier, which burst has modulated said carrier in amplitude and phase, said burst comprising separated symbols constituting data and at least one unique word which comprises the steps of:

i. converting said received signal to an approximate baseband signal, ii. subjecting said baseband signal covering a period corresponding to duration of said burst plus timing uncertainties to analogue to digital sampling, iii. estimating an initial timing synchronization for said burst from said unique word in samples obtained in step ii, iv. subjecting said samples corresponding to said unique words to the initial timing synchronization, v. estimating from initial timed samples obtained in step iv a coarse frequency correction for said samples obtained in step ii, vi. subjecting said samples obtained in step ii to the coarse frequency correction, vii. estimating a fine timing for coarse frequency corrected samples from step vi by correlating only those samples corresponding to said unique word with known true value for the unique word at at least three different time offsets, a first at the initial timing synchronization estimate of step iii and a second offset and a third offset respectively before and after said first offset, relating magnitudes of said correlations against time for the three offsets and determining a maximum correlation against time, and vii. subjecting coarse frequency corrected samples obtained in step vi to a timing offset corresponding to that of said maximum to yield coarse frequency/fine timed samples.

viii. removing modulation from those samples corresponding to at least one symbol in each of said first and second unique words to produce corresponding first and second unmodulated baseband tones, ix. estimating a phase shift)$\Delta\Phi$ between a first average phase of the first tone and a second average phase of the second tone, x. determining a set of possible phase ambiguities)$\Delta\Phi + 2k\pi$ for such phase shift, where k is selected from the set of integers and corresponding frequency offsets to such phase ambiguities up to a limit imposed by predetermined known uncertainty in baseband frequency of said corrected samples, xi. selecting one of said frequency offsets, xii. further correcting the samples by one of said frequency offsets with a phase initialized to match said first and second average phases, xiii. determining, for each symbol constituting each unique word the squared error of its corresponding soft symbol determined from the corrected samples of step xii, xiv. computing the sum of the squared errors, xv. iterating steps xi to xiv for each frequency offset, xvi. calculating the minimum of the sums obtained in step xiv, xvii. selecting as a fine frequency estimate that frequency offset which yields the minimum in step xvi, and xviii. storing as fine frequency/fine timed/phase corrected and amplitude normalized samples, the samples corrected by said selected fine frequency estimate of step xvii.

15. The method of claim 14 wherein there is at least a pair of separate unique words in the burst and wherein the coarse frequency/fine timed samples are subsequently corrected for phase errors, comprising the steps of:

xix. correlating such coarse frequency/fine timed samples for each respective unique word with the known value of the respective unique word to remove modulation and obtain a single respective unmodulated tone for each last mentioned sample, xx. summing the tones obtained in step xix to obtain a complex number representing average amplitude and average phase of said samples for each respective unique word, xxi. estimating phase error in the samples corresponding to each respective unique word from said complex number, and xxii. correcting phase error in all the said coarse frequency/fine timed samples by interpolation from phase error for said each unique word determined in step xxi.

16. The method of claim 15 comprising the additional steps for obtaining coarse frequency/fine timed/phase corrected and amplitude normalized samples:

xxiii. normalizing amplitudes of the samples corresponding to said unique words by comparing the average amplitude obtained in step xx with known true amplitudes for said unique words, and xxiv. normalizing amplitude for all remaining samples in the coarse frequency/fine timed samples based on the normalized amplitudes of the unique word samples obtained in step xxiii.

17. The method of claim 14 including between the steps xiii and xiv the following additional steps:

xxv. for data symbols in said samples obtained in claim 16, deciding a value for each said data symbol by choosing the closest symbol known to have been a possible transmitted symbol, and xxvi. determining for each decided value the squared error of its corresponding soft value.

18. The method comprising subjecting the samples obtained by the method of claim 14 to a method of computing an approximation of the reliability value of individual bits in the information symbols where each symbol is constituted by a multiplicity of such bits which symbols have been degraded by noise and where the true value of each information symbol is defined by one of a chosen plurality of constellation points in a two-dimensional planar array; comprising the additional steps of:

xxvii. plotting all those true values as such constellation points within the two-dimensional array, xxviii. defining each true value in the array by a corresponding unique set of bit values, xxix. predetermining an initial soft value for a first of said symbols degraded by noise, xxx. mapping that soft value onto the array as a soft value point, xxxi. computing the square of the distance of said soft value point from each constellation point which has a "0" bit in a first position of its said set, xxxii. finding a first minimum of the squares computed in step xxxi, xxxiii. computing the square of the distance of said soft value point from each constellation point which has a "1" bit in said first position of its said set, xxxiv. finding a second minimum of the last mentioned squares computed in step xxxiii, xxxv. subtracting the first minimum from the second minimum, xxxvi. recording the result of step xxxv as a reliability estimate for that bit in said first position in the set of bit values for said symbol represented by the soft value, xxxvii. reiterating steps xxxi to xxxvi for obtaining reliability estimates for the bits in the remaining positions in the set for said symbol represented by said soft value.

19. The method of claim 18 comprising:

xxxviii. predetermining initial soft values for the remainder of said symbols, and obtaining reliability estimates for each said remainder by reiterating steps xxx to xxxvii.

20. The method of claim 14 wherein the step of relating magnitude of said correlations to time comprises parabolic interpolation of said correlations, the maximum being at the parabolic maximum.

21. In a system for processing a digital signal comprising a burst of symbols constituting data and a pair of known separate unique words, wherein said burst has been transmitted on a carrier, modulated by said burst, and which carrier has been subsequently down converted to an approximate baseband signal, and wherein said approximate baseband signal has been subjected to analog to digital sampling, to provide digitized amplitude and phase information samples constituting said baseband signal over a time period corresponding to the duration of said burst plus timing uncertainties, and wherein the samples have been initially corrected by subjecting to initial timing synchronization in an anticipated time frame for said burst and to an initial frequency correction toward zero baseband, apparatus for obtaining a finer frequency correction for said initially corrected samples representing said baseband signal, which comprises:

means removing modulation from those initially corrected samples corresponding to at least one symbol in each of said known first and second unique words to produce corresponding first and second unmodulated baseband tones, means estimating a phase shift)$\Delta\Phi$ between a first average phase of the first tone and a second average phase of the second tone, means determining a set of possible phase ambiguities) $\Delta\Phi+2k\pi$ for such phase shift, where k is selected from the set of integers and corresponding frequency offsets to such phase ambiguities up to a limit imposed by predetermined known uncertainty in baseband frequency of said corrected samples, means selecting one of said frequency offsets, means further correcting the initially corrected samples by one of said frequency offsets with a phase initialized to match said first and second average phases, means determining, for each symbol constituting each unique word the squared error of its corresponding soft symbol determined from the further corrected samples from said further correcting means, means computing the sum of the squared errors, means causing iteration by said four last mentioned means for a second and subsequent ones of said frequency offsets, means calculating the minimum of the sums obtained from the squared error sum computing means, means selecting as a fine frequency estimate that frequency offset which yields the minimum from said minimum calculating means, and means selecting as fine frequency corrected samples, those samples from said further correcting means corrected by said selected fine frequency estimate.

22. The system of claim 21 further comprising:

for data symbols in said initially corrected samples, means, connected to said further correcting means, deciding a value for each said data symbol by choosing the closest predetermined symbol known to have been a possible transmitted symbol, means determining for each decided value the squared error from its corresponding soft value, and means connecting said last mentioned means to said squared error computing means.

23. In a system for computing an approximation of the reliability value of individual bits in an information symbol constituted by a multiplicity of such bits, and which symbol has been degraded by noise; where the true value of the information symbol is defined by one of a chosen plurality of constellation points in a two-dimensional planar array, and each true value in the array being defined by a corresponding unique set of bit values; apparatus which comprises, means predetermining an initial soft value for the said symbol degraded by noise, means mapping that soft value onto the array as a soft value point, first means computing the square of the distance of said soft value point on the array from each constellation point in the array which has a "0" bit in a first position of its said set, means finding a first minimum of the squares computed by said first computing means, second means computing the square of the distance of said soft value point from each constellation point which has a "1" bit in said first position of its said set, means finding a second minimum of the last mentioned squares computed by the second computing means, means subtracting the first minimum from the second minimum, means recording output from said subtracting means as a reliability estimate for that bit in said first position in the set of bit values for said symbol represented by the soft value, and means causing reiteration of said first computing means, said first minimum finding means, said second computing means, said subtracting means, and said recording means, for obtaining reliability estimates for the bits in the remaining positions in the set for said symbol represented by said soft value.

* * * * *

UNITED STATES PATENT AND TRADEMARK OFFICE
CERTIFICATE OF CORRECTION

PATENT NO. : 6,693,983 B1
APPLICATION NO. : 09/412229
DATED : February 17, 2004
INVENTOR(S) : Michael L. Moher et al.

It is certified that error appears in the above-identified patent and that said Letters Patent is hereby corrected as shown below:

In the References Cited section, under OTHER PUBLICATIONS, delete "Detection of Signals with Random Parameters/ 1971/ pp. 197-227." and insert therefor -- A.D. Whalen/ Detection of Signals in Noise/ Academic Press/ San Diego/ 1971/ pp. 196-227.--; delete "S.N. Crozier/ Theoretical and Simulated Performance for a Novel Frequency Estimation Technique/ pp. 423-428." and insert therefor -- S.N. Crozier/Theoretical and Simulated Performance for a Novel Frequency Estimation Technique/ Third International Mobile Satellite Conference/ June 1993/ Pasadena California/ pp. 423-428. --

In the drawings, Sheet 3, Figure 3, an arrow line should be added between the bottom end of the block 535 and the left end of the block 532; the Label "Yes" should be applied to the right end of 538; the label "NO" should be applied to the bottom end of 538.

In the drawings, Sheet 4, Figure 4, in block 557 delete "Compute "0" Squared Distanances" and insert therefor -- Compute "0" Squared Distances --; in block 558 delete "Compute "0" Squared Distanances" and insert therefor -- Compute "1" Squared Distances --

In the drawings, Sheet 5, Figure 5, a dot labeled "s" should be added in the top right quadrant of the coordinate system with the in phase coordinate of "s" comprised between +1 and +3, and the Quadrature coordinate comprised between +1 and +3.

Column 1, line 63 delete "is" and insert therefor -- it is --

Column 4, line 65 delete "$y(nT) = x(n) * x((n-4)T)^C$" and insert therefor -- $y(nT) = x(nT) * x((n-4)T)^C$ --

Column 7, line 19 delete "$\forall 1, \forall 2$" and insert therefor -- $\pm 1, \pm 2$ --

UNITED STATES PATENT AND TRADEMARK OFFICE
CERTIFICATE OF CORRECTION

PATENT NO. : 6,693,983 B1
APPLICATION NO. : 09/412229
DATED : February 17, 2004
INVENTOR(S) : Michael L. Moher et al.

It is certified that error appears in the above-identified patent and that said Letters Patent is hereby corrected as shown below:

Column 8, lines 22 to 24 delete "e) for the soft symbol ... the distance from s." and insert therefor -- e) for the soft symbol s compute 558 for each of those eight constellation points in step d) the square of the distance from s. --; line 37 delete "iterate 580, 540" and insert therefor -- iterate 580, 545 --.

Column 9, line 63 delete "shift)" and insert therefor -- shift --; line 66 delete "ambiguities)" and insert therefor -- ambiguities --.

Column 11, line 17 delete "Th e" and insert therefor -- The --; line 18 delete "and in" and insert therefor -- and is --.

Column 12 line 5 delete "shift)" and insert therefor -- shift --; line 8 delete "ambiguities)" and insert therefor -- ambiguities --; line 64 delete "claim 14" and insert therefor -- claim 16 --.

Column 14 line 6 delete "shift)" and insert therefor -- shift --; line 9 delete "ambiguities)" and insert therefor -- ambiguities --.

Signed and Sealed this

Second Day of September, 2008

JON W. DUDAS
*Director of the United States Patent and Trademark Office*